United States Patent
Cao

(10) Patent No.: US 9,686,672 B2
(45) Date of Patent: Jun. 20, 2017

(54) METHOD FOR PROMPTING IDENTIFICATION CARD INFORMATION, MOBILE TERMINAL AND ELECTRONIC DEVICE

(71) Applicant: Sony Corporation, Tokyo (JP)

(72) Inventor: George Cao, Beijing (CN)

(73) Assignee: Sony Mobile Communications Inc., Tokyo (JP)

( * ) Notice: Subject to any disclaimer, the term of this patent is extended or adjusted under 35 U.S.C. 154(b) by 131 days.

(21) Appl. No.: 14/147,776

(22) Filed: Jan. 6, 2014

(65) Prior Publication Data
US 2014/0342777 A1 Nov. 20, 2014

(30) Foreign Application Priority Data
May 14, 2013 (CN) .......................... 2013 1 0176677

(51) Int. Cl.
*H04B 1/38* (2015.01)
*H04M 1/00* (2006.01)
(Continued)

(52) U.S. Cl.
CPC ....... *H04W 8/183* (2013.01); *H04M 1/72519* (2013.01); *H04M 1/72586* (2013.01); *H04W 88/06* (2013.01); *H04M 2250/66* (2013.01)

(58) Field of Classification Search
CPC ............ H04B 1/3816; H04M 2250/14; H04M 1/72586; H04W 8/183; G06Q 30/0222; G06Q 30/0205; G06Q 30/06
(Continued)

(56) References Cited

U.S. PATENT DOCUMENTS 7,047,041 B2 * 5/2006 Vanska .............. G06Q 30/0222
455/403
7,644,859 B1 * 1/2010 Zhu ........................ G06Q 20/12
235/375
(Continued)

FOREIGN PATENT DOCUMENTS

| EP | 2458833 A2 | 5/2012 |
| EP | 2584768 A2 | 4/2013 |
| WO | 2013093560 A1 | 6/2013 |

OTHER PUBLICATIONS

International Search Report and Written Opinion corresponding to International Application No. PCT/IB2014/061147 dated Aug. 25, 2014.

(Continued)

Primary Examiner — Simon Nguyen
(74) Attorney, Agent, or Firm — Renner, Otto, Boisselle & Sklar, LLP

(57) ABSTRACT

The embodiments of the present invention provide a method for prompting identification card information, a mobile terminal and an electronic device. The method for prompting information includes: determining a most appropriate identification card from the more than one identification card when an identification card is to be used; and displaying information of the more than one identification card on a display screen of the electronic device, wherein the most appropriate identification card and other identification cards are displayed discriminatively. In the embodiments of the present invention, an appropriate identification card may be recommended to the user, and the user can be prompted intuitively, so as to obtain better user experiences.

15 Claims, 9 Drawing Sheets

(51) Int. Cl.
*H04W 8/18* (2009.01)
*H04W 88/06* (2009.01)
*H04M 1/725* (2006.01)

(58) Field of Classification Search
USPC .................................. 455/558, 410–411, 566
See application file for complete search history.

(56) References Cited

U.S. PATENT DOCUMENTS

| | | | | |
|---|---|---|---|---|
| 8,285,329 | B1* | 10/2012 | Zhu | ....................... G06F 21/629 |
| | | | | 235/380 |
| 8,406,741 | B2 | 3/2013 | Kang et al. | |
| 8,532,707 | B2* | 9/2013 | Kim | ............................... 455/558 |
| 2006/0234693 | A1* | 10/2006 | Isidore et al. | ............. 455/422.1 |
| 2008/0064443 | A1* | 3/2008 | Shin et al. | ................... 455/558 |
| 2008/0167074 | A1 | 7/2008 | Van Steenbergen | |
| 2008/0300008 | A1* | 12/2008 | Kim | ........................... 455/552.1 |
| 2009/0221291 | A1 | 9/2009 | Yach | |
| 2011/0070922 | A1* | 3/2011 | Kim | ............................... 455/558 |
| 2011/0081951 | A1* | 4/2011 | Hwang | ......................... 455/558 |
| 2012/0135715 | A1* | 5/2012 | Kang | ..................... H04W 8/183 |
| | | | | 455/412.1 |
| 2012/0178500 | A1* | 7/2012 | Hwang | ................. H04W 8/183 |
| | | | | 455/558 |
| 2012/0265685 | A1* | 10/2012 | Brudnicki | .............. G06Q 30/06 |
| | | | | 705/44 |
| 2013/0079059 | A1* | 3/2013 | Huslak | .......................... 455/558 |
| 2014/0099805 | A1* | 4/2014 | Kutchery | ............. H04B 1/3816 |
| | | | | 439/76.1 |
| 2014/0179373 | A1* | 6/2014 | Hur et al. | ...................... 455/558 |
| 2015/0065197 | A1* | 3/2015 | Wu | ................... H04M 1/72519 |
| | | | | 455/558 |

OTHER PUBLICATIONS

International Preliminary Report on Patentability for corresponding International Application No. PCT/IB2014/061147 dated Nov. 17, 2015.

* cited by examiner

METHOD FOR PROMPTING IDENTIFICATION CARD INFORMATION, MOBILE TERMINAL AND ELECTRONIC DEVICE

CROSS-REFERENCE TO RELATED APPLICATION AND PRIORITY CLAIM

This application claims priority from Chinese patent application No. 201310176677.6, filed May 14, 2013, the entire disclosure of which hereby is incorporated by reference.

TECHNICAL FIELD

The present invention relates to communication technologies, and particularly, to a method for prompting identification card information, a mobile terminal and an electronic device.

BACKGROUND

With the development of communication technologies, electronic devices using a plurality of identification cards appear. For example, multiple dual-card dual-standby mobile terminals exist at present, and those mobile terminals, for example, use a Subscriber Identity Module (SIM) card of a Global System for Mobile Communication (GSM) system and a SIM card of a Code Division Multiple Access (CDMA) system.

By using an electronic device having a plurality of identification cards, the user can select an appropriate identification card upon demand to perform a service operation. For example, the SIM card of CDMA may be used for a data transmission, while the SIM card of GSM may be used for a voice phone call. Multiple services can be realized by using one electronic device, thus the usage flexibility is improved.

SUMMARY

However, in the prior art the user has to judge by himself which SIM card is to be used. For example, the user may select the SIM card of CDMA in a data transmission according to his personal experience or memory. But the user's experience may be limited or the memory may be inaccurate, thus the appropriate SIM card often may not be selected. As a result, resources are wasted, and the better user experience may not be achieved.

To be noted, the above introductions to the technical background are just given for facilitating the clear and complete descriptions of the technical solutions of the present invention, and facilitating the understanding of those skilled in the art. It shall not be deemed that the above technical solutions are known to those skilled in the art just because they are set forth in the background art of the present invention.

The embodiments of the present invention provide a method for prompting identification card information, a mobile terminal and an electronic device, for the purpose of selecting an appropriate identification card when an identification card is to be used, and intuitively prompting the user.

According to an aspect of an embodiment of the present invention, a method for prompting identification card information is provided, which is applicable to an electronic device using more than one identification card, the method for prompting including:

determining a most appropriate identification card from the more than one identification card when an identification card is to be used; and displaying information of the more than one identification card on a display screen of the electronic device, wherein the most appropriate identification card and other identification cards are displayed discriminatively.

According to another aspect of an embodiment of the present invention, the determining a most appropriate identification card from the more than one identification card specifically includes:

determining a most appropriate identification card from the more than one identification card based on any one or arbitrary combinations of information of an object operating with the identification card, historical information, statistical information of the identification card, location information of the electronic device, time information, and price information of the identification card.

According to another aspect of an embodiment of the present invention, the situation in which an identification card is to be used includes: an identification card is to be used for a phone call or answer, for sending or receiving a short message, or for a data transmission.

According to another aspect of an embodiment of the present invention, the electronic device is a mobile terminal, and the identification card includes SIM card, Micro-SIM card, Mini-SIM card, Nano-SIM card, RFID-SIM card or USIM card.

According to another aspect of an embodiment of the present invention, displaying the most appropriate identification card and other identification cards discriminatively specifically includes:

setting a display size of a button corresponding to the most appropriate identification card to be larger than those of buttons corresponding to the other identification cards.

According to another aspect of an embodiment of the present invention, displaying the most appropriate identification card and other identification cards discriminatively specifically includes:

setting display color, or display brightness, or pattern shape of corresponding information of the most appropriate identification card to be different from those of corresponding information of the other identification cards.

According to another aspect of an embodiment of the present invention, displaying the most appropriate identification card and other identification cards discriminatively specifically includes:

statically or dynamically setting corresponding information of the most appropriate identification card to be different from corresponding information of the other identification cards.

According to another aspect of an embodiment of the present invention, the method further includes:

calculating the appropriateness degree of the most appropriate identification card; and determining the discrimination degree of the most appropriate identification card relative to the other identification cards according to the appropriateness degree.

According to another aspect of an embodiment of the present invention, the higher the appropriateness degree of the most appropriate identification card is, the larger the display size of a button corresponding to the most appropriate identification card is, relative to those of buttons corresponding to the other identification cards.

According to still another aspect of an embodiment of the present invention, an electronic device using more than one identification card is provided, including:

a determination unit, configured to determine a most appropriate identification card from the more than one identification card when an identification card is to be used; and a display unit, configured to display information of the more than one identification card on a display screen, wherein the most appropriate identification card and other identification cards are displayed discriminatively.

According to still another aspect of an embodiment of the present invention, the determination unit is specifically configured to determine a most appropriate identification card from the more than one identification card based on any one or arbitrary combinations of information of an object operating with the identification card, historical information, statistical information of the identification card, location information of the electronic device, time information, and price information of the identification card.

According to still another aspect of an embodiment of the present invention, the display unit is specifically configured to set a display size of a button corresponding to the most appropriate identification card to be larger than those of buttons corresponding to the other identification cards.

According to still another aspect of an embodiment of the present invention, the electronic device further includes:

a calculation unit, configured to calculate the appropriateness degree of the most appropriate identification card; and the display unit is further configured to determine the discrimination degree of the most appropriate identification card relative to the other identification cards according to the appropriateness degree.

According to yet another aspect of an embodiment of the present invention, a mobile terminal using more than one identification card is provided, includes:

a determination unit, configured to determine a most appropriate identification card from the more than one identification card when an identification card is to be used; and a display unit, configured to display information of the more than one identification card on a display screen, wherein the most appropriate identification card and other identification cards are displayed discriminatively.

According to yet another aspect of an embodiment of the present invention, the display unit is specifically configured to set a display size of a button corresponding to the most appropriate identification card to be larger than those of buttons corresponding to other identification cards.

The beneficial effect of the present invention is that by determining a most appropriate identification card when an identification card is to be used, and displaying the most appropriate identification card and other identification cards discriminatively to prompt the user, an appropriate identification card can be selected for the user, and the user can be prompted intuitively to obtain better user experiences.

These and other aspects of the present invention will be clear with reference to the following descriptions and drawings, in which the specific embodiments of the present invention are detailedly disclosed to indicate some ways for implementing the principle of the present invention. However, it shall be appreciated that the scope of the present invention is not limited thereto. On the contrary, the present invention includes any change, modification and equivalent falling within the scope of the spirit and the connotation of the accompanied claims.

Features that are described and/or illustrated with respect to one embodiment may be used in the same or similar way in one or more other embodiments, and/or used by being combined with or replacing the features of other embodiments.

To be noted, the term "include/comprise" herein refers to the existence of feature, element, step or component, not excluding the existence or addition of one or more other features, elements, steps, components or combinations thereof.

Various aspects of the present invention can be better understood with reference to the following drawings. The components in the drawings are not necessarily drafted to scale, and the emphasis is laid upon clearly illustrating the principle of the present invention. For the convenience of illustrating and describing some parts of the present invention, corresponding parts in the drawings may be enlarged in size, e.g., enlarged to be larger than the case in the exemplary device actually made according to the present invention, relative to other parts. Components and features depicted in one drawing or embodiment of the present invention may be combined with components and features depicted in one or more additional drawings or embodiments. Moreover, in the drawings, the same reference signs designate corresponding parts throughout the drawings and may be used to designate the same or similar parts in at least one embodiment.

BRIEF DESCRIPTION OF THE DRAWINGS

The included drawings are used for providing further understandings of the present invention, and they constitute a part of the Specification. Those drawings illustrate the preferred embodiments of the present invention and elaborate the principle of the present invention together with the descriptions, wherein the same or similar elements are represented with the same reference sign, and "primed" reference numerals represent elements that are the same or similar to elements that are designated by the same unprimed reference numeral, and so on.

In the drawings.

DESCRIPTION

The interchangeable terms "electronic device" and "electronic apparatus" include a portable radio communication device. The term "portable radio communication device" (hereinafter referred to as "mobile radio terminal", "portable electronic apparatus" or "portable communication apparatus") includes devices such as mobile phone, pager, communication apparatus, electronic diary, Personal Digital Assistant (PDA), smart phone, portable communication apparatus, etc.

In the present application, the embodiments of the present invention are mainly described with respect to the portable electronic apparatus in form of mobile phone (also referred to as "cell phone"). However, it shall be appreciated that the present invention is not limited to the mobile phone, and may relate to an electronic device of any appropriate type, for example media player, game device, PDA and computer, digital camera, tablet computer, etc.

Embodiment 1

Figure 1:
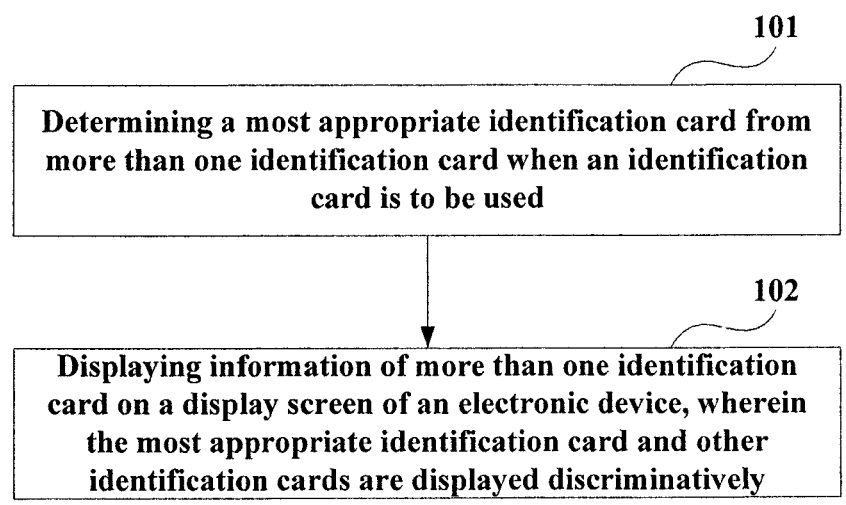
FIG. 1 is a flow diagram of a method for prompting identification card information according to Embodiment 1 of the present invention.

An embodiment of the present invention provides a method for prompting identification card information, which is applicable to an electronic device using more than one identification card. FIG. 1 is a flow diagram of a method for prompting identification card information according to the embodiment of the present invention. As illustrated in FIG. 1, the method for prompting includes:

Step 101: determining a most appropriate identification card from more than one identification card when an identification card is to be used.

Step 102: displaying information of more than one identification card on a display screen of the electronic device, wherein the most appropriate identification card and other identification cards are displayed discriminatively, so as to recommend a user to use the most appropriate identification card.

In the embodiment, the situation "an identification card is to be used" specifically may include: an identification card is to be used for a phone call or an answer, or for sending or receiving a short message, or for a data transmission. But the present invention is not limited thereto, and it is applicable to other scenarios requiring using identification card.

In the embodiment, the electronic device may be a mobile terminal, and the identification card may include: SIM card, Micro-SIM card, Mini-SIM card, Nano-SIM card, RFID-SIM card or USIM card, etc. The electronic device may use more than one identification card (e.g., two identification cards). The identification card may include a 2G card which only performs the voice service or short message service, and a 3G card which not only performs the voice service or short message service, but also provides 3G Internet service for data transmission. In addition, the data transmission is not limited to 3G Internet access, and for example the RFID-SIM card may be used for a non-contact mobile payment.

To be noted, the present invention is not limited thereto. For example, the electronic device may be a computer device installed with two identification cards, through which a wireless data transmission is performed. Or, more than two identification cards may also be used. In addition, the identification card is not limited to a SIM card, and it may be specifically determined based on the actual conditions. Next, an example will be given to detailedly describe the present invention, where the electronic device is a mobile terminal, and two identification cards are used, i.e., the SIM card of CDMA (CDMA card) and the SIM card of GSM (GSM card).

In the embodiment, determining a most appropriate identification card from more than one identification card specifically may include: determining a most appropriate identification card from more than one identification card, based on information of an object operating with the identification card, or statistical information of the identification card, or location information of the electronic device, or historical information, or time information, or price information of the identification card.

In one embodiment, the most appropriate identification card may be determined based on the information of the object operating with the identification card, where the information of the object operating with the identification card may be a newly called phone number. For example, if the newly called phone number indicates a user of the GSM network, it can be determined in step 101 that the GSM card in the mobile terminal is taken as the most appropriate identification card for the present service.

In addition, the information of the object operating with the identification card may also be information of service type. For example, when it hopes to perform a wireless data transmission (e.g., 3G Internet access) through the identification card, and in fact the signal quality is better by using the CDMA card for Internet access. It can be determined in step 101 that the CDMA card in the mobile terminal is taken as the most appropriate identification card for the present service.

In addition, the information of the object operating with the identification card may also be information of triggering service. For example, when a Near Field Communication (NFC) device is used for a near contact with the electronic device, an RFID-SIM card of the electronic device would be triggered to process services. In that case, the RFID-SIM card may be determined as the most appropriate identification card.

In another embodiment, the most appropriate identification card may be determined based on historical information. For example, an SIM card (e.g., GSM card) which recently received a phone call or a short message may be taken as the most appropriate identification card for the present phone call. Or, when a certain phone number is called back, an SIM card which recently contacted the phone number (e.g., the identification card which recently answered/called the phone number is a GSM card) may be taken as the most appropriate identification card for the present phone call. Or, when a short message is returned to a certain phone number, an SIM card which recently contacted the phone number (e.g., the identification card which recently received/sent a short message from/to the phone number is a GSM card) may be taken as the most appropriate identification card for the present phone call.

In another embodiment, the most appropriate identification card may be determined based on the statistical information of the identification card. For example, the network access speeds of the identification cards are counted, and when the identification cards are used for wireless data transmission, an identification card having the highest network access speed is taken as the most appropriate identification card for the present service. Or, for example the voice conversation time of the identification cards is counted, and when the identification cards are used for voice call, an identification card having the longest voice conversation time is taken as the most appropriate identification card for the present service.

In another embodiment, the most appropriate identification card may be determined based on the location information of the electronic device. For example, when the electronic device is not in the local city (e.g., when the user goes on a business trip) and the identification cards are used for voice call, the GSM card is taken as the most appropriate identification card for the present service.

In another embodiment, the most appropriate identification card may be determined based on the time information. For example, when the phone call is made during the working time (e.g., 8:00-17:00 from Monday to Friday), the GSM card may be taken as the most appropriate identification card; and when the phone call is made during other time (e.g., from Saturday to Sunday), the CDMA card may be taken as the most appropriate identification card.

In another embodiment, the most appropriate identification card may be determined based on the price information of the identification card. For example, the electronic device may automatically send a request message to request the operator for the price conditions of the identification cards, and then determine the most appropriate identification card according to the price conditions.

For example, the CDMA card may have a monthly flat rate setting with a voice duration of 80 minutes, while the GSM card may have a voice service fee per minute lower than the CDMA card. Thus, when the phone call is made, it is judged whether the voice duration of the month exceeds 80 minutes; and if not, the CDMA card is taken as the most appropriate identification card for the present phone call; or if yes, the GSM card is taken as the most appropriate identification card for the present phone call.

To be noted, the above examples only schematically illustrate how to determine the most appropriate identification card, but the present invention is not limited thereto, and other embodiments may be determined based on actual conditions. Moreover, various conditions in the above examples are set individually, while the determination may be made based on a combination of several or all of the conditions. For example, the most appropriate identification card may be determined based on a combination of the time information and the historical information, or a combination of the statistical information, the time information and the price information, etc., and the specific rule may be set based on actual conditions.

In addition, the specific manner for determining the most appropriate identification card may be preset through hardware or software. Or, an interactive interface (e.g., a man-machine interactive interface) may be provided, so that the user dynamically sets the determination rule or condition. The present invention is not limited thereto, and the specific embodiment may be determined based on actual conditions.

In this embodiment, the information of more than one identification card may be displayed on the display screen, and the information of the identification card may be icon, button, text or picture of corresponding identification card. For example, information corresponding to each identification card may be displayed in the form of icon or text. For another example, information corresponding to each identification card may be displayed statically or dynamically.

In one embodiment, displaying the most appropriate identification card and other identification cards discriminatively specifically may include: setting a display size of a button corresponding to the most appropriate identification card to be larger than those of buttons corresponding to other identification cards.

In this embodiment, the most appropriate identification card and other identification cards may be displayed discriminatively by setting the display sizes of the buttons, thus the user can be prompted intuitively, and the identification card to be used in the present service can be recommended to the user. To be noted, the present invention is not limited to displaying discriminatively based on the magnitude of the display size.

In another embodiment, the display color, or display brightness, or pattern shape of corresponding information of the most appropriate identification card may be set to be different from those of corresponding information of other identification cards. For example, the most appropriate identification card may be set in a dark color, while other identification cards may be set in light colors.

In another embodiment, the corresponding information of the most appropriate identification card may also be statically or dynamically set to be different from the corresponding information of other identification cards. For example, the most appropriate identification card may be set as a dynamically changed icon, while other identification cards may be set as static icons.

To be noted, the above descriptions are just exemplary to illustrate how to display the most appropriate identification card and other identification cards discriminatively. The present invention is not limited thereto, and the specific embodiment of discriminative display may be determined based on actual conditions. Next, the present invention will be described exemplarily through an example where the display size of the button is set.

Figure 2:
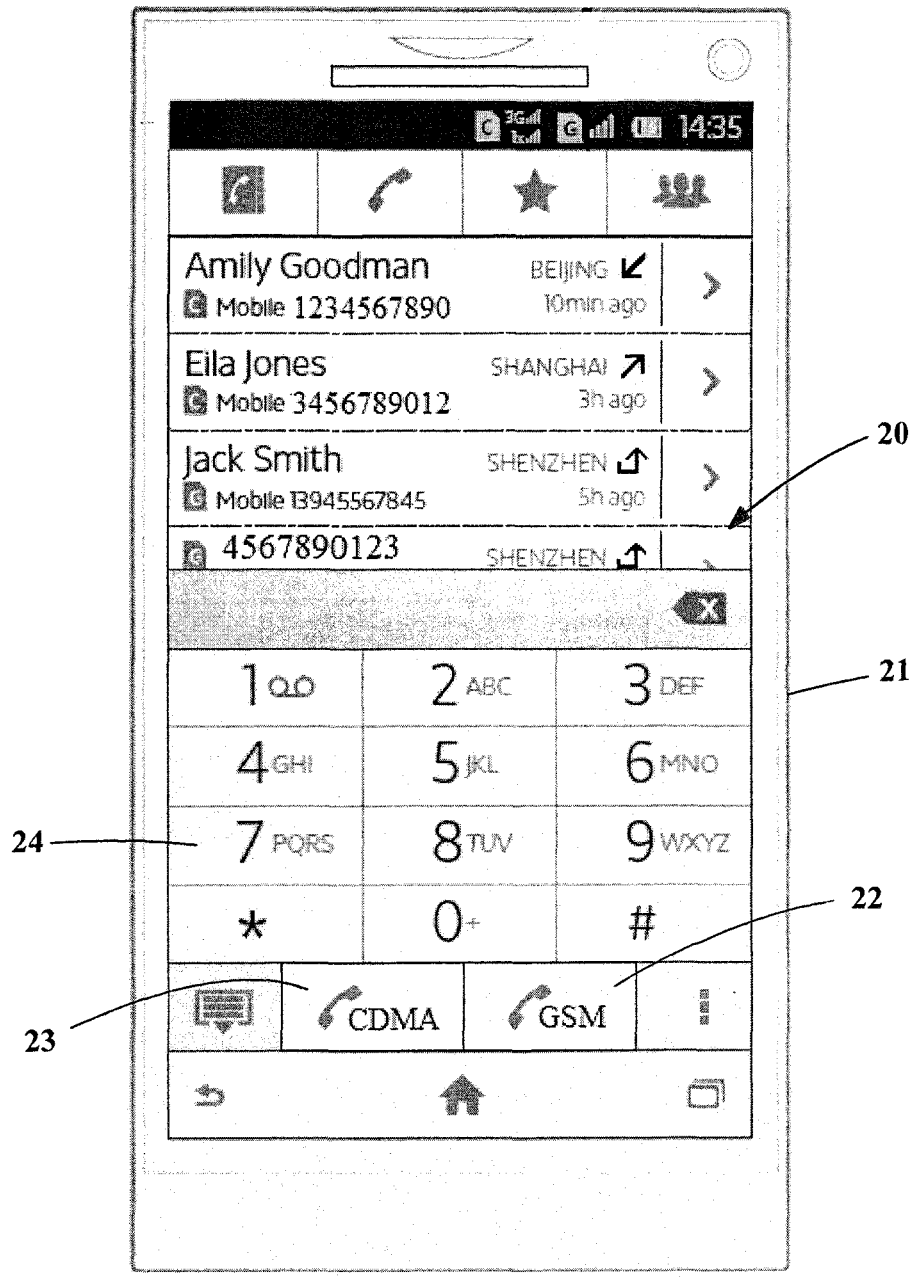
FIG. 2 is a schematic diagram of a user interface of an electronic device according to Embodiment 1 of the present invention.

FIG. 2 is a schematic diagram of a user interface 20 of an electronic device 21 according to an embodiment of the present invention, which illustrates a user interface before a request operation is performed. As illustrated in FIG. 2, buttons 22, 23 corresponding to the GSM card and the CDMA card, respectively, may be displayed on the display screen 24. In that case, the display sizes of the buttons corresponding to the GSM card and the CDMA card are the same as each other.

Figure 3:
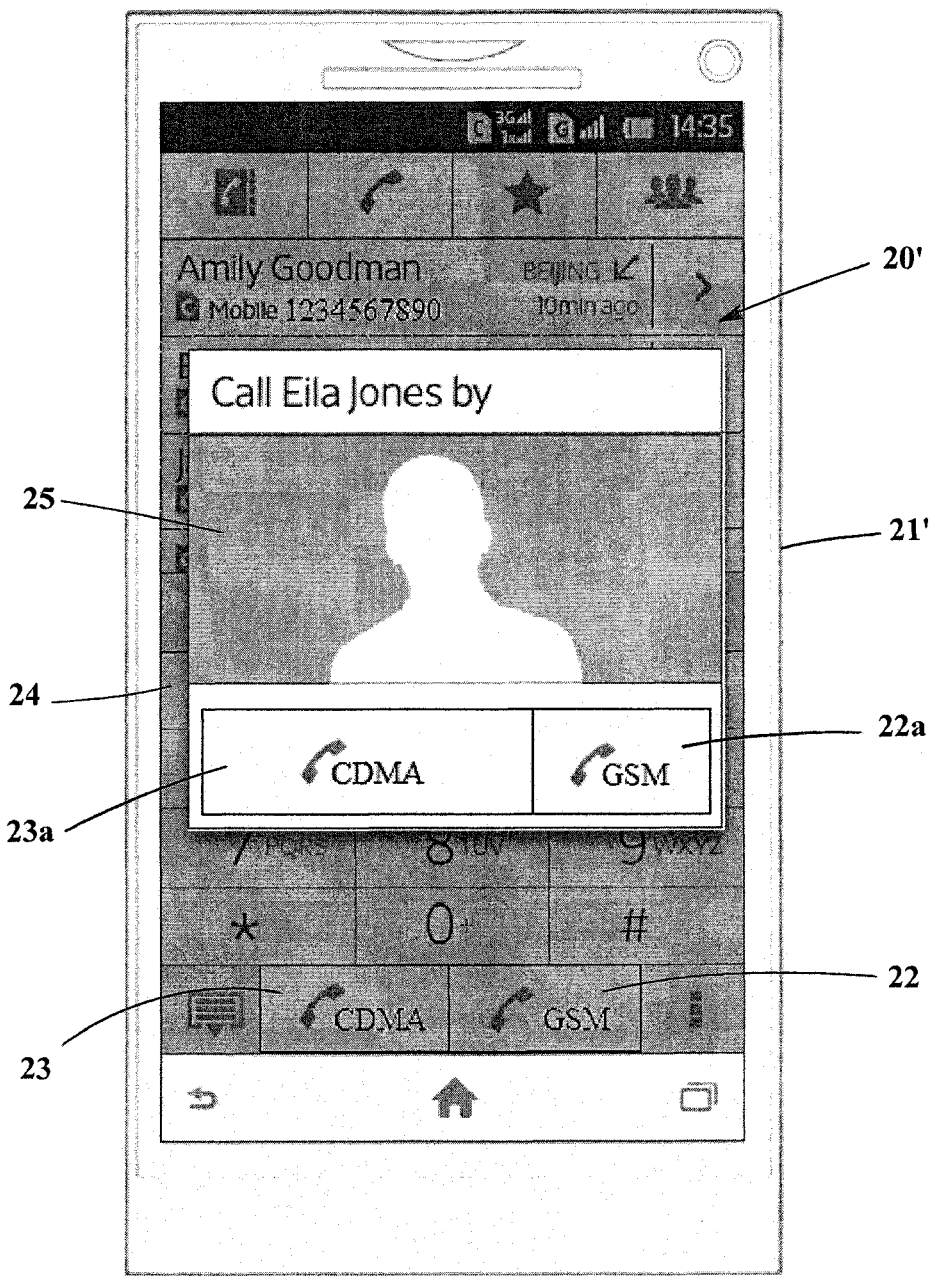
FIG. 3 is another schematic diagram of a user interface of an electronic device according to Embodiment 1 of the present invention.

FIG. 3 is another schematic diagram of a user interface 20' of an electronic device 21' according to an embodiment of the present invention, which illustrates a user interface 20' after a request operation is performed. As illustrated in FIG. 3, after a request operation of calling back to "Eila Jones" is performed, the electronic device 21' may determine to take the CDMA card as the most appropriate identification card for the present call (e.g., the determination may be made based on the historical information, i.e., last time the CDMA card is used for calling "Eila Jones").

Next, as illustrated in FIG. 3, a call preparing picture 25 will pop up, where the buttons 22a, 23a corresponding to the GSM card and the CDMA card are displayed, and the button 23a corresponding to the CDMA card has a larger display size than the button 22a corresponding to the GSM card. Thus the user can be prompted intuitively, and recommended to use the CDMA card for the call.

Figure 4:
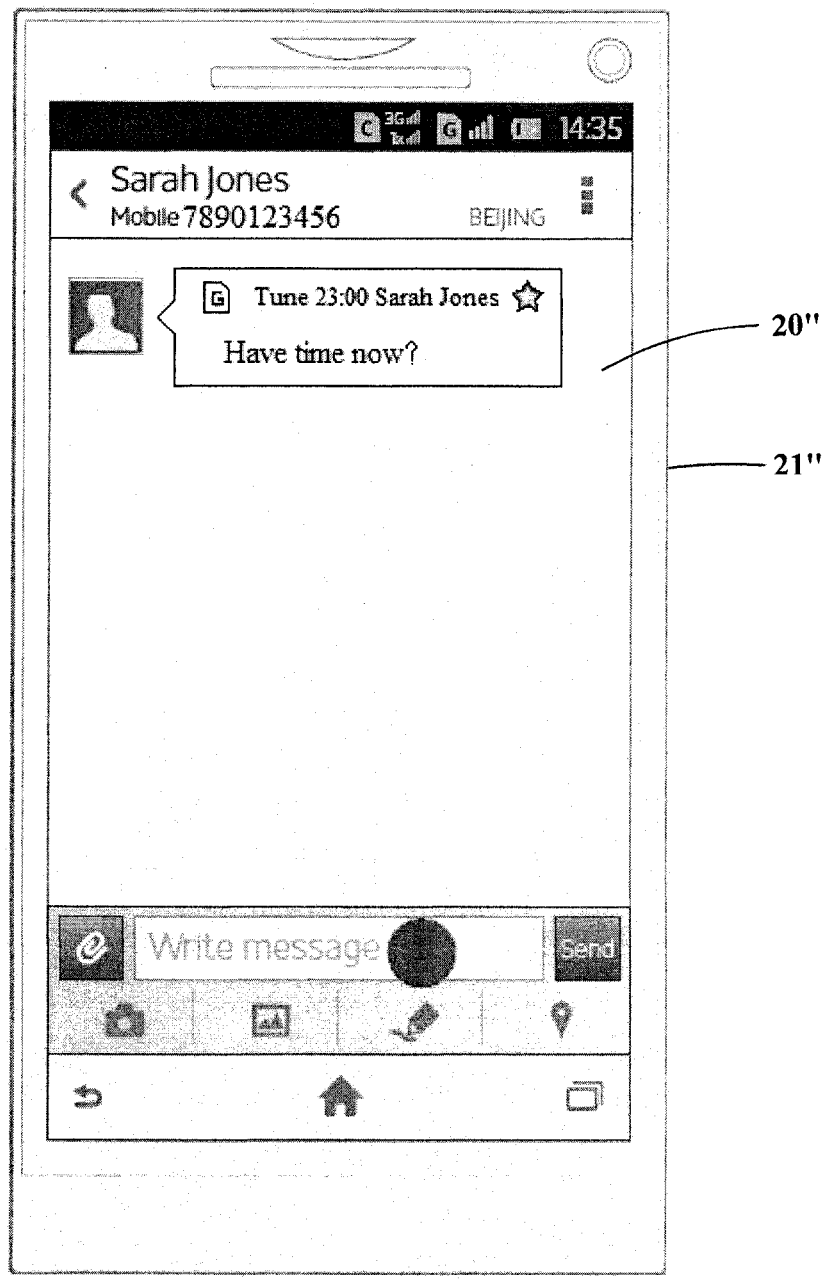
FIG. 4 is still another schematic diagram of a user interface of an electronic device according to Embodiment 1 of the present invention.

FIG. 4 is still another schematic diagram of a user interface 20" of an electronic device 21" according to an embodiment of the present invention, which illustrates a user interface 20" before a request operation is performed. As illustrated in FIG. 4, the electronic device 21" has received a short message from "Sarah Jones" through the GSM card, and now can reply to the short message.

Figure 5:
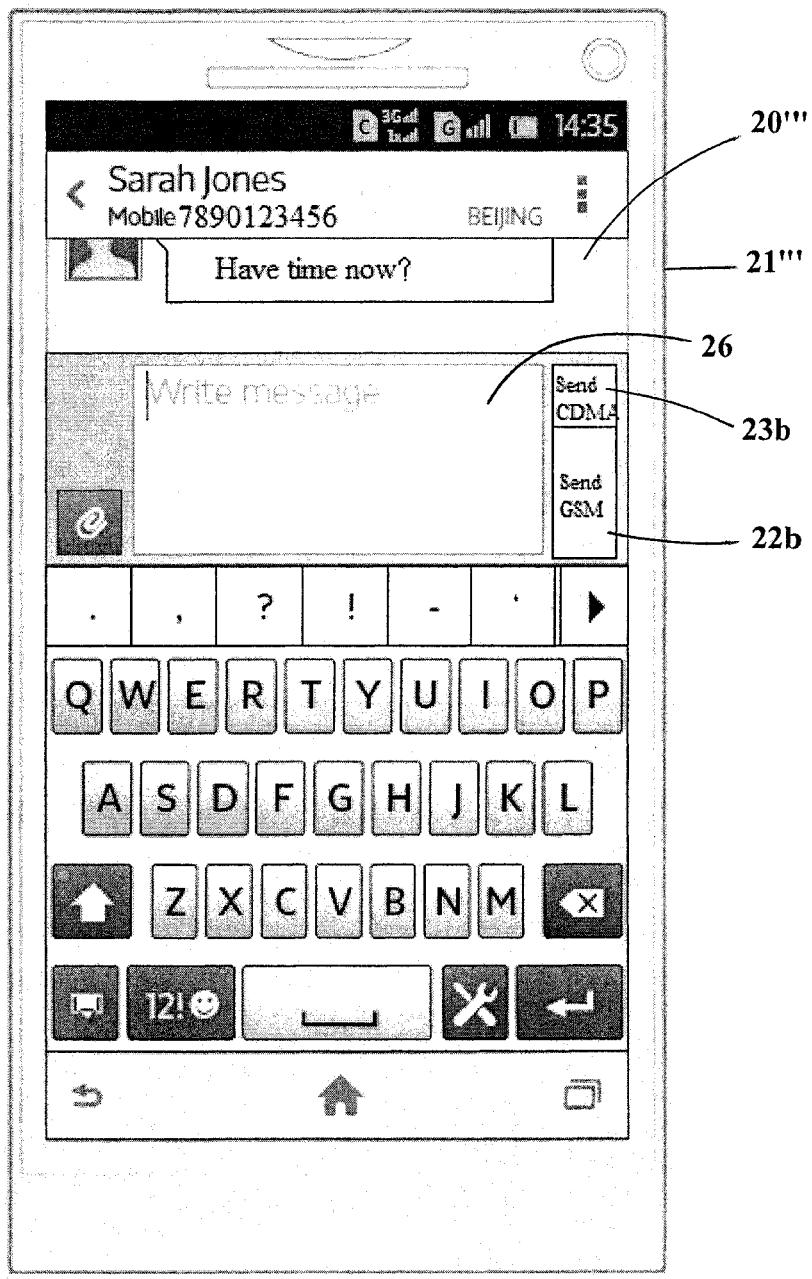
FIG. 5 is yet another schematic diagram of a user interface of an electronic device according to Embodiment 1 of the present invention.

FIG. 5 is yet another schematic diagram of a user interface 20''' of an electronic device 21''' according to an embodiment of the present invention, which illustrates a user interface 20''' after a request operation is performed. As illustrated in FIG. 5, after a request operation of replying to the short message from "Sarah Jones" is performed, the electronic device 21''' may determine to take the GSM card as the most appropriate identification card for the present reply (e.g., the determination may be made based on the historical information, i.e., the GSM card is used for receiving the short message from "Sarah Jones").

Next, as illustrated in FIG. 5, an edit picture 26 preparing for the reply may pop up, wherein the buttons 22b, 23b corresponding to the GSM card and the CDMA card are displayed, and the button 22b corresponding to the GSM card has a larger display size than the button 23b corresponding to the CDMA card. Thus the user can be prompted intuitively, and recommended to use the GSM card for replying to the short message.

To be noted, FIGS. 2 to 5 only schematically illustrate how to display discriminatively, and the information in those drawings (e.g., icons, phone numbers, etc.) is just used for exemplary descriptions. The present invention is not limited thereto, and the specific display pictures may be determined based on actual conditions.

As can be seen from the above embodiment, by determining a most appropriate identification card when an identification card is to be used, and displaying the most appropriate identification card and other identification cards discriminatively to prompt the user, an appropriate identification card can be selected for the user, and the user can be prompted intuitively to obtain better user experiences.

Embodiment 2

On the basis of Embodiment 1, the embodiment of the present invention provides a method for prompting identification card information, which is applicable to an electronic device using more than one identification card. The contents the same as those in Embodiment 1 are omitted herein.

Figure 6:
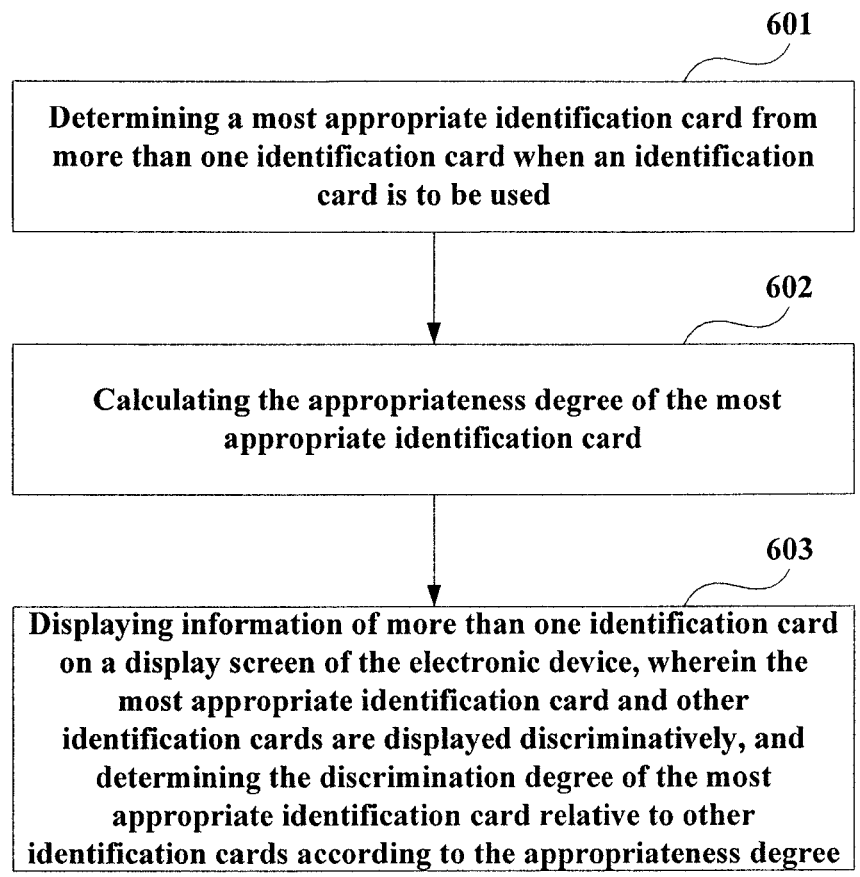
FIG. 6 is another flow diagram of a method for prompting identification card information according to Embodiment 2 of the present invention.

FIG. 6 is another flow diagram of a method for prompting identification card information according to an embodiment of the present invention. As illustrated in FIG. 6, the method for prompting includes:

Step 601: determining a most appropriate identification card from more than one identification card when an identification card is to be used.

Step 602: calculating the appropriateness degree of the most appropriate identification card.

Step 603: displaying information of more than one identification card on a display screen of the electronic device; where the most appropriate identification card and other identification cards are displayed discriminatively, and determining the discrimination degree of the most appropriate identification card relative to other identification cards according to the appropriateness degree.

In this embodiment, the appropriateness degree of the most appropriate identification card may be further calculated, so as to determine the discrimination degree according to the appropriateness degree. Therefore, the user can be prompted more intuitively, and the identification card can be recommended more accurately. For example, the recommendation accuracy increases with the amount of the historical information or the statistical information.

Specifically, for example, the higher the appropriateness degree of the most appropriate identification card is, the larger the display size of the button corresponding to the most appropriate identification card is, relative to those of the buttons corresponding to other identification cards. Or, the higher the appropriateness degree of the most appropriate identification card is, the darker the display color corresponding to the most appropriate identification card is, relative to the display colors corresponding to other identification cards.

In this embodiment, please refer to the prior art for the specific method for calculating the appropriateness degree. For example, an optimizing constraint may be made according to the historical information or the statistical information, so as to obtain the probabilistic information of each identification card for usage in the present service, and take the probabilistic information as the numerical value representing the appropriateness degree. The specific embodiment may be determined based on actual conditions.

As can be seen from the above embodiment, by determining a most appropriate identification card when an identification card is to be used, and displaying the most appropriate identification card and other identification cards discriminatively to prompt the user, an appropriate identification card can be selected for the user, and the user can be prompted intuitively to obtain better user experiences.

Embodiment 3

The embodiment of the present invention provides an electronic device using more than one identification card. The embodiment is corresponding to the method for prompting identification card information in Embodiment 1, and the same contents are omitted herein.

Figure 7:
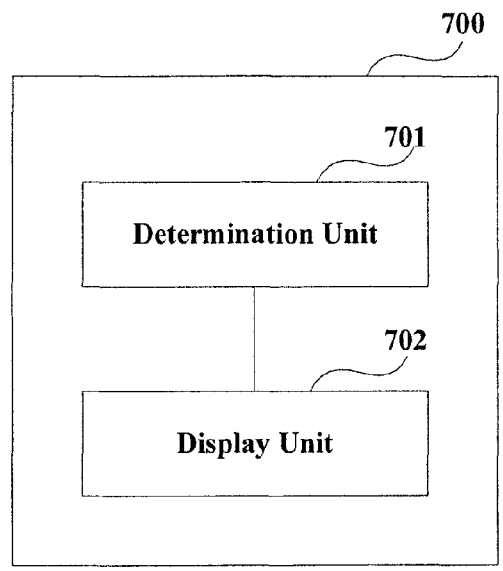
FIG. 7 is a structure diagram of an electronic device according to Embodiment 3 of the present invention.

FIG. 7 is a structure diagram of an electronic device according to an embodiment of the present invention. As illustrated in FIG. 7, the electronic device 700 includes a determination unit 701 and a display unit 702. Refer to the prior art for other parts of the electronic device 700.

The determination unit 701 determines a most appropriate identification card from more than one identification card when an identification card is to be used. The display unit 702 displays information of more than one identification card on a display screen, where the most appropriate identification card and other identification cards are displayed discriminatively, so as to recommend a user to use the most appropriate identification card.

In implementation, the determination unit 701 specifically may be configured to determine a most appropriate identification card from more than one identification card based on information of an object operating with the identification card, or statistical information of the identification card, or location information of the electronic device, or historical information, or time information, or price information of the identification card.

In implementation, the display unit 702 specifically may be configured to set a display size of a button corresponding to the most appropriate identification card to be larger than those of buttons corresponding to other identification cards.

As can be seen from the above embodiment, by determining a most appropriate identification card when an identification card is to be used, and displaying the most appropriate identification card and other identification cards discriminatively to prompt the user, an appropriate identification card can be selected for the user, and the user can be prompted intuitively to obtain better user experiences.

Embodiment 4

The embodiment of the present invention provides an electronic device using more than one identification card. The embodiment is corresponding to the method for prompting identification card information in Embodiment 2, and the same contents are omitted herein.

Figure 8:
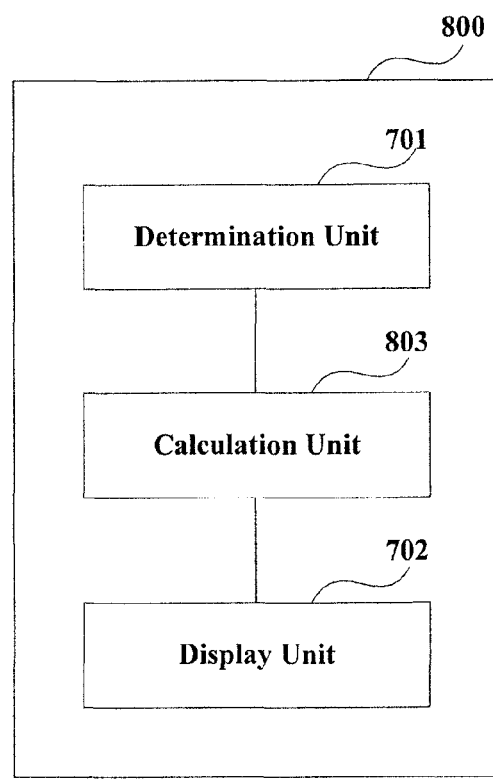
FIG. 8 is a structure diagram of an electronic device according to Embodiment 4 of the present invention.

FIG. 8 is a structure diagram of an electronic device according to an embodiment of the present invention. As illustrated in FIG. 8, the electronic device 800 includes the determination unit 701 and the display unit 702, as described in Embodiment 3. Refer to the prior art for other parts of the electronic device 800.

As illustrated in FIG. 8, the electronic device 800 may further include a calculation unit 803 configured to calculate the appropriateness degree of the most appropriate identification card. In addition, the display unit 702 is further configured to adjust the discrimination degree of the most appropriate identification card relative to other identification cards.

As can be seen from the above embodiment, by determining a most appropriate identification card when an identification card is to be used, and displaying the most appropriate identification card and other identification cards discriminatively to prompt the user, an appropriate identification card can be selected for the user, and the user can be prompted intuitively to obtain better user experiences.

Embodiment 5

The embodiment of the present invention provides a mobile terminal using more than one identification card. The embodiment is corresponding to the method for prompting identification card information in Embodiments 1 and 2, and the same contents are omitted herein.

Figure 9:
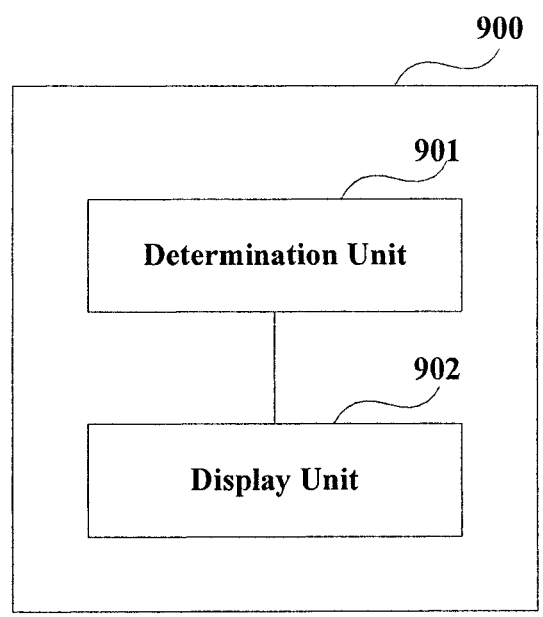
FIG. 9 is a structure diagram of a mobile terminal according to Embodiment 5 of the present invention.

FIG. 9 is a structure diagram of a mobile terminal according to an embodiment of the present invention. As illustrated in FIG. 9, the mobile terminal 900 includes a determination unit 901 and a display unit 902. Refer to the prior art for other parts of the mobile terminal 900.

The determination unit 901 determines a most appropriate identification card from more than one identification card when an identification card is to be used. The display unit 902 displays information of more than one identification card on a display screen, wherein the most appropriate identification card and other identification cards are displayed discriminatively, so as to recommend a user to use the most appropriate identification card.

In implementation, the determination unit 901 specifically may be configured to determine a most appropriate identification card from more than one identification card based on information of an object operating with the identification card, or statistical information of the identification card, or location information of the electronic device, or historical information, or time information, or price information of the identification card.

In implementation, the display unit 902 specifically may be configured to set a display size of a button corresponding to the most appropriate identification card to be larger than those of buttons corresponding to other identification cards.

Figure 10:
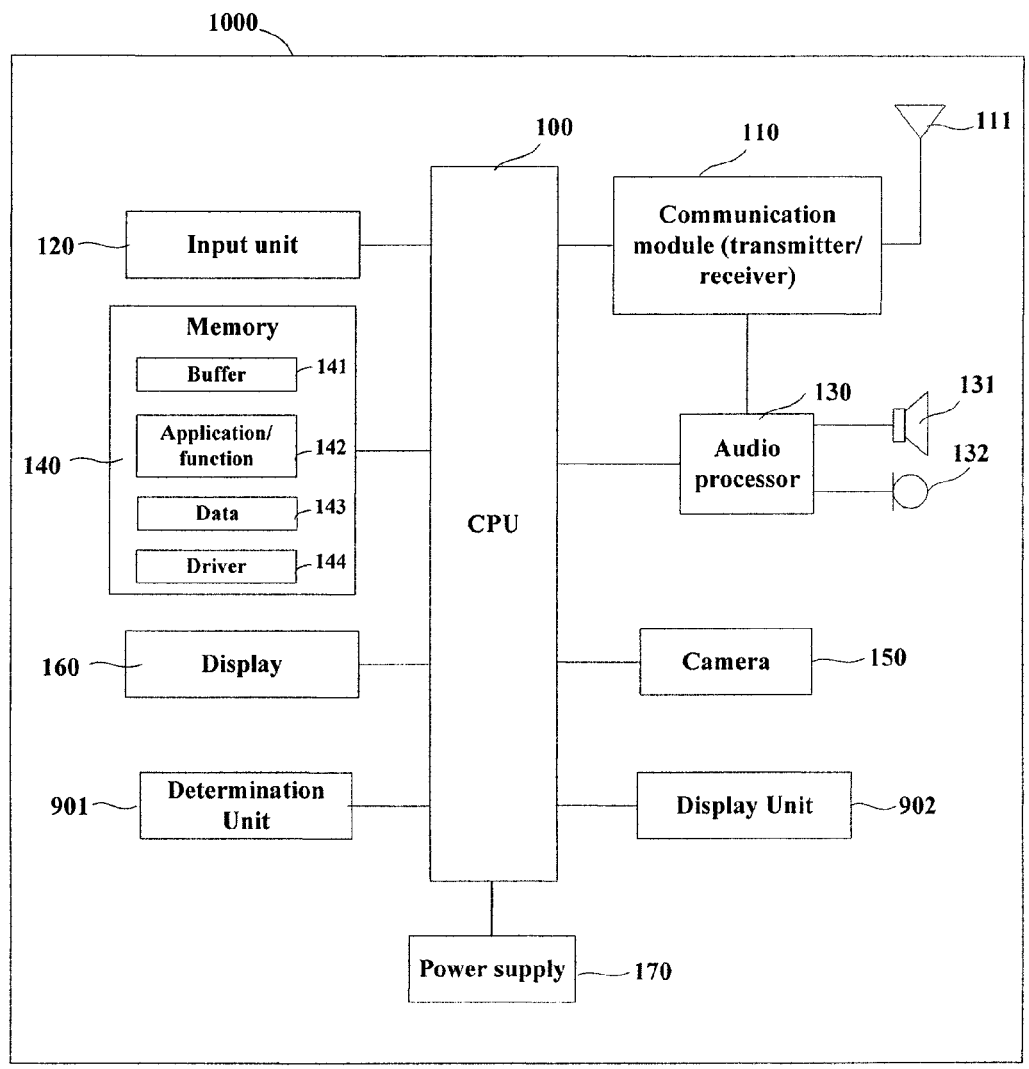
FIG. 10 is a schematic block diagram of the system constitution of a mobile terminal according to Embodiment 5 of the present invention.

FIG. 10 is a schematic block diagram of the system constitution of a mobile terminal 1000 according to Embodiment 5 of the present invention, including the determination unit 901 and the display unit 902. As illustrated in FIG. 10, the determination unit 901 and the display unit 902 may be connected to a Central Processing Unit (CPU) 100. To be noted, the drawing is exemplary, and other type of structure may be used to supplement or replace the structure, so as to realize the telecom function or other function.

As illustrated in FIG. 10, the mobile terminal 1000 may further include a CPU 100, a communication module 110, an input unit 120, an audio processor 130, a memory 140, a camera 150, a display 160 and a power supply 170.

The CPU 100 (sometimes is also referred to as controller or operation control, including the microprocessor or other processor device and/or logic device) receives an input and controls various parts and operations of the mobile terminal 1000. The input unit 120 supplies an input to the CPU 100. The input unit 120 for example is a keypad or a touch input device. The camera 150 captures image data, and provides the captured image data to the CPU 100 for conventional usage, such as storage, transmission, etc.

The power supply 170 is configured to supply electric power to the mobile terminal 1000. The display 160 is configured to display a display object such as image and text. The display for example may be, but not limited to, an LCD display.

The memory 140 is coupled to the CPU 100. The memory 140 may be a solid memory such as Read Only Memory (ROM), Random Access Memory (RAM) and SIM card. The memory 140 also may be such a memory that stores information even if the power is off, and that can be selectively erased and provided with more data; sometimes the example of the memory is referred to as EPROM. The memory 140 further may be a certain device of other type. The memory 140 includes a buffer memory 141 (sometimes is referred to as buffer). The memory 140 may include an application/function storage section 142 configured to store application programs and function programs, or perform operation procedures of the mobile terminal 1000 through the CPU 100.

The memory 140 may further include a data storage section 143 configured to store data such as contact, digital data, photo, sound and/or any other data used by the electronic device. A drive program storage section 144 of the memory 140 may include various drive programs of the electronic device for communication function and/or other functions of the electronic device (e.g., message transfer application, address book application, etc.).

The communication module 110 is a transmitter/receiver 110 which transmits and receives signals via an antenna 111. The communication module (transmitter/receiver) 110 is coupled to the CPU 100, so as to provide an input signal and an output signal, which may be the same as the situation of the conventional mobile communication terminal.

Based on different communication technologies, a plurality of communication modules 110 (e.g., cellular network modules, Bluetooth modules and/or Wireless Local Area Network (WLAN) modules) may be provided in the same electronic device. The communication module (transmitter/receiver) 110 is further coupled to a speaker 131 and a microphone 132 via an audio processor 130, so as to provide an audio output via the speaker 131, and receive an audio input from the microphone 132, thereby realizing the common telecom function. The audio processor 130 may include any appropriate buffer, decoder, amplifier, etc. In addition, the audio processor 130 is further coupled to the CPU 100, so as to locally record a sound through the microphone 132, and play the sound locally stored through the speaker 131.

The embodiment of the present invention further provides a computer readable program, wherein when being executed in an electronic device, the program enables a computer to perform the method for prompting identification card information as described in Embodiment 1 or 2 in the electronic device.

The embodiment of the present invention further provides a storage medium which stores a computer readable program, wherein the computer readable program enables the computer to perform the method for prompting identification card information as described in Embodiment 1 or 2 in an electronic device.

The preferred embodiments of the present invention are described above with reference to the drawings. Many features and advantages of those embodiments are apparent from the detailed Specification, thus the accompanied claims intend to cover all such features and advantages of those embodiments which fall within the true spirit and the scope thereof. Further, since numerous modifications and changes are easily conceivable to those skilled in the art, the embodiments of the present invention are not limited to the exact structures and operations as illustrated and described, and they cover all suitable modifications and equivalents falling within the scope thereof.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of including one or more modules, segments or parts for realizing the codes of executable instructions of the steps in specific logic functions or processes, and that the scope of the preferred embodiments of the present invention include other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system based on a computer, a system including a processor, or other systems capable of extracting instructions from an instruction executing system, device or apparatus and executing the instructions), or for use in combination with the instruction executing system, device or apparatus.

The above literal description and drawings show various features of the present invention. It should be understood that a person of ordinary skill in the art may prepare suitable computer codes to carry out each of the steps and processes described above and illustrated in the drawings. It should also be understood that the above-described terminals, computers, servers, and networks, etc. may be any type, and the computer codes may be prepared according to the disclosure contained herein to carry out the present invention by using the devices.

Specific embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

The invention claimed is:

1. A method for prompting identification card information, which is applicable to an electronic device using more than one identification card, the method for prompting comprising:
  determining a most appropriate identification card from the more than one identification card when an identification card is to be used, the more than one identification card being a physical card insertable in the electronic device and operative to enable the electronic device to identify and authenticate a subscriber to a wireless network;
  calculating an appropriateness degree of the most appropriate identification card;
  displaying a first information for selecting a first identification card of the more than one identification card; and
  displaying, simultaneous with the first information, a second information for selecting a second identification card of the more than one identification card, said displaying including determining a discrimination degree of the most appropriate identification card relative to the other identification cards according to the appropriateness degree,
  wherein when the first identification card is determined to be the most appropriate identification card the first information is displayed relative to the second information to indicate a preference of the first identification card over the second identification card, and when the second identification card is determined to be the most appropriate identification card the second information is displayed relative to the first information to indicate a preference of the second identification card over the first identification card.

2. The method according to claim 1, wherein determining a most appropriate identification card from the more than one identification card specifically comprises:
  determining a most appropriate identification card from the more than one identification card based on any one or arbitrary combinations of information of an object operating with the identification card, historical information, statistical information of the identification card, location information of the electronic device, time information, and price information of the identification card.

3. The method according to claim 1, wherein the determining step is carried out in a situation in which an identification card is to be used for a phone call or answer, for sending or receiving a short message, or for a data transmission.

4. The method according to claim 1, wherein displaying the most appropriate identification card and other identification cards discriminatively comprises:

setting a display size of a button corresponding to the most appropriate identification card to be larger than those of buttons corresponding to the other identification cards.

5. The method according to claim 1, wherein displaying the most appropriate identification card and other identification cards discriminatively comprises:

setting display color, or display brightness, or pattern shape of corresponding information of the most appropriate identification card to be different from those of corresponding information of the other identification cards.

6. The method according to claim 1, wherein displaying the most appropriate identification card and other identification cards discriminatively comprises:

statically or dynamically setting corresponding information of the most appropriate identification card to be different from corresponding information of the other identification cards.

7. The method according to claim 1, wherein the higher the appropriateness degree of the most appropriate identification card is, the larger the display size of a button corresponding to the most appropriate identification card is, relative to those of buttons corresponding to the other identification cards.

8. The method according to claim 1, wherein determining the most appropriate identification card comprises determining the most appropriate SIM card, Micro-SIM card, Mini-SIM card, Nano-SIM card, RFID-SIM card or USIM card.

9. A method for prompting identification card information, which is applicable to an electronic device using more than one identification card, the method for prompting comprising:

determining a most appropriate identification card from the more than one identification card when an identification card is to be used;

calculating an appropriateness degree of the most appropriate identification card;

displaying a first information for selecting a first identification card of the more than one identification card; and displaying, simultaneous with the first information, a second information for selecting a second identification card of the more than one identification card, said displaying including determining a discrimination degree of the most appropriate identification card relative to the other identification cards according to the appropriateness degree, wherein when the first identification card is determined to be the most appropriate identification card the first information is displayed relative to the second information to indicate a preference of the first identification card over the second identification card, and when the second identification card is determined to be the most appropriate identification card the second information is displayed relative to the first information to indicate a preference of the second identification card over the first identification card, wherein the electronic device is a mobile terminal, and the determining the most appropriate identification card comprises determining the most appropriate SIM card, Micro-SIM card, Mini-SIM card, Nano-SIM card, RFID-SIM card or USIM card.

10. An electronic device using more than one identification card, comprising:

a determination unit, configured to determine a most appropriate identification card from the more than one identification card when an identification card is to be used, the more than one identification card being a physical card insertable in the electronic device and operative to enable the electronic device to identify and authenticate a subscriber to a wireless network;

a calculation unit, configured to calculate an appropriateness degree of the most appropriate identification card; and a display unit, configured to display a first information for selecting a first identification card of the more than one identification card, and display, simultaneous with the first information, a second information for selecting a second identification card of the more than one identification card, wherein when the first identification card is determined to be the most appropriate identification card the first information is displayed relative to the second information to indicate a preference of the first identification card over the second identification card, and when the second identification card is determined to be the most appropriate identification card the second information is displayed relative to the first information to indicate a preference of the second identification card over the first identification card, and determine the discrimination degree of the most appropriate identification card relative to the other identification cards according to the appropriateness degree.

11. The electronic device according to claim 10, wherein the determination unit is specifically configured to determine a most appropriate identification card from the more than one identification card based on any one or arbitrary combinations of information of an object operating with the identification card, historical information, statistical information of the identification card, location information of the electronic device, time information, and price information of the identification card.

12. The electronic device according to claim 10, wherein the display unit is configured to set a display size of a button corresponding to the most appropriate identification card to be larger than those of buttons corresponding to the other identification cards.

13. The electronic device according to claim 10, wherein the electronic device comprises a mobile terminal.

14. The electronic device according to claim 13, wherein the display unit is configured to set a display size of a button corresponding to the most appropriate identification card to be larger than those of buttons corresponding to other identification cards.

15. The electronic device according to claim 13, wherein the determination unit is configured to determine the most appropriate SIM card, Micro-SIM card, Mini-SIM card, Nano-SIM card, RFID-SIM card or USIM card.

* * * * *